United States Patent
Schwartz et al.

(10) Patent No.: US 9,053,241 B2
(45) Date of Patent: Jun. 9, 2015

(54) SCRIPTING APPLICATION WITH ROLE IDENTIFICATION

(75) Inventors: Dror Schwartz, Holon (IL); Amir Kessner, Ramat-Gan (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 533 days.

(21) Appl. No.: 12/814,345

(22) Filed: Jun. 11, 2010

(65) Prior Publication Data
US 2011/0307868 A1    Dec. 15, 2011

(51) Int. Cl.
*G06F 9/44*        (2006.01)
*G06F 11/36*       (2006.01)
*G06F 9/455*       (2006.01)

(52) U.S. Cl.
CPC ........ *G06F 11/3692* (2013.01); *G06F 9/45512* (2013.01)

(58) Field of Classification Search
CPC ............ G06F 9/45513; G06F 11/3466; G06F 11/3664; G06F 11/3688; G06F 11/3692; G06F 9/44526; G06F 9/45512; G06F 8/38; G06F 8/60
See application file for complete search history.

(56) References Cited

U.S. PATENT DOCUMENTS

| | | | | |
|---|---|---|---|---|
| 6,549,216 B1* | 4/2003 | Schumacher et al. | ........ | 715/704 |
| 6,874,143 B1* | 3/2005 | Murray et al. | ................ | 717/173 |
| 7,779,027 B2* | 8/2010 | James et al. | ................. | 707/769 |
| 8,074,217 B2* | 12/2011 | James et al. | .................. | 717/175 |
| 8,136,109 B1* | 3/2012 | Birdeau et al. | ................ | 717/175 |
| 8,352,875 B2* | 1/2013 | Peltz et al. | ..................... | 715/762 |
| 8,370,811 B2* | 2/2013 | Grechanik et al. | ............ | 717/125 |
| 8,549,480 B2* | 10/2013 | Cohen et al. | .................. | 717/125 |
| 8,572,568 B2* | 10/2013 | Giat | ............................. | 717/124 |
| 8,677,324 B2* | 3/2014 | Markuza et al. | .............. | 717/127 |
| 2005/0132232 A1* | 6/2005 | Sima | ............................. | 713/201 |
| 2009/0225037 A1* | 9/2009 | Williamson et al. | .......... | 345/173 |
| 2010/0095161 A1* | 4/2010 | Giat | ................ | 714/45 |
| 2010/0095208 A1* | 4/2010 | White et al. | .................. | 715/704 |
| 2011/0131551 A1* | 6/2011 | Amichai et al. | .............. | 717/125 |
| 2012/0150939 A1* | 6/2012 | Zaifman et al. | .............. | 709/203 |
| 2012/0185823 A1* | 7/2012 | Monza et al. | ................. | 717/115 |
| 2013/0097586 A1* | 4/2013 | Chandra et al. | .............. | 717/124 |

OTHER PUBLICATIONS

Yip et al., Privacy-preserving browser-side scripting with BFlow, Apr. 2009, 14 pages.*
T. Nivas, Test harness and script design principles for automated testing of non-GUI or web based applications, Jul. 2011, 8 pages.*
Daniel et al., Automated GUI refactoring and test script repair, Jul. 2011, 4 pages.*
Grechanik et al., Maintaining and evolving GUI-directed test scripts, May 2009, 11 pages.*

* cited by examiner

*Primary Examiner* — Thuy Dao
(74) *Attorney, Agent, or Firm* — Conley Rose, P.C.

(57) ABSTRACT

In at least some embodiments, a computer system includes a processor and a computer-readable storage medium coupled to the processor and storing a scripting application. The scripting application, when executed, is configured to selectively record user actions on user interface (UI) objects of a browser hosted application based on identification of at least one role for each UI object.

20 Claims, 2 Drawing Sheets

SCRIPTING APPLICATION WITH ROLE IDENTIFICATION

BACKGROUND

Application programs, including web-based applications such as web pages, and the hardware associated with the applications, are often tested under extreme use conditions. Such conditions may be provided by a system that simulates a number of users simultaneously executing the application. A user may be simulated by execution of a program (e.g., a previously acquired script) that provides appropriate user inputs and responses to exercise the application.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
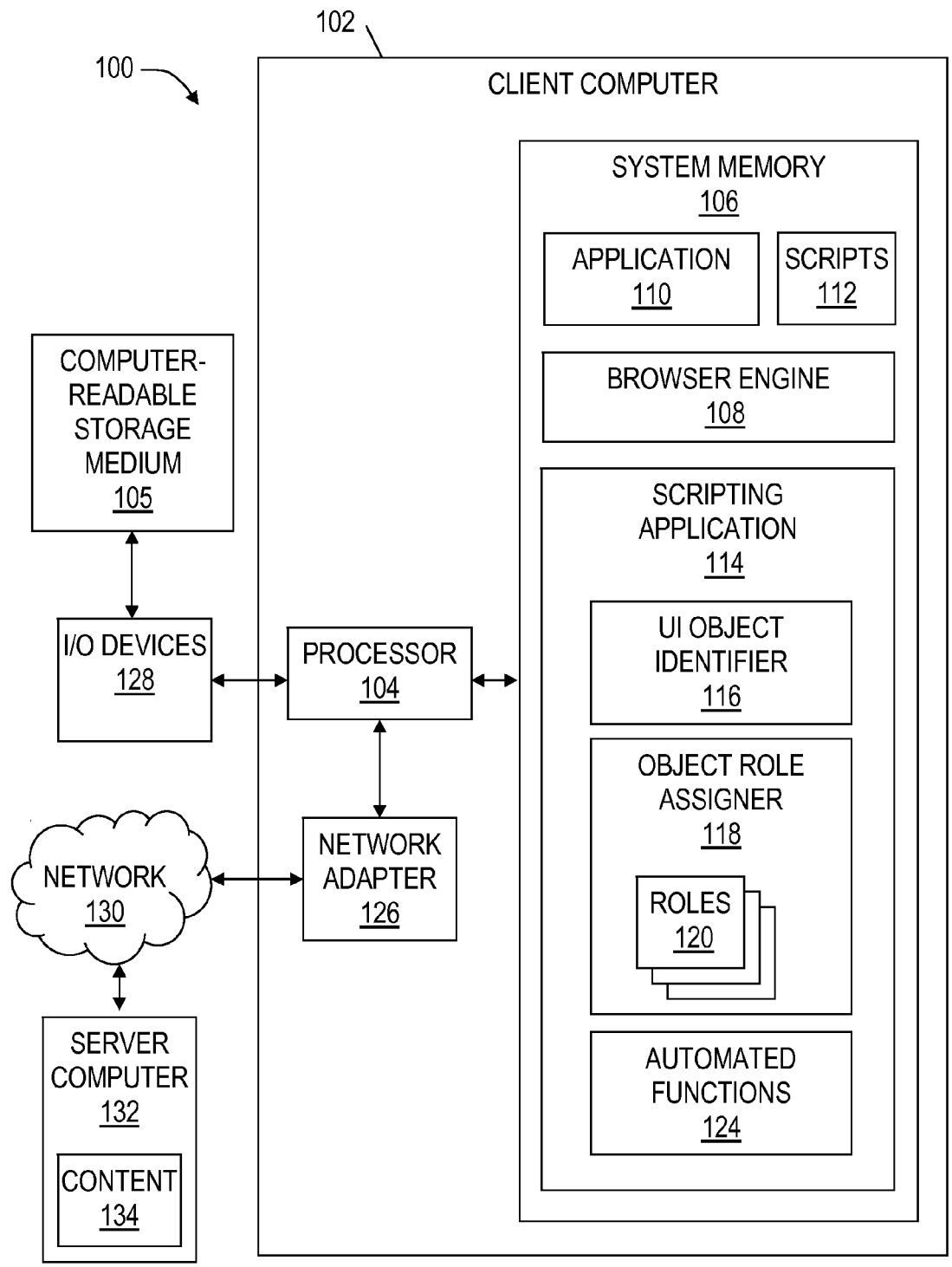
FIG. 1 shows a system that in accordance with an embodiment of the disclosure.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Applications based on the World Wide Web (i.e., web applications) have increased in functionality and complexity to the extent that they now resemble desktop or thick-client applications. A web page's document object model ("DOM") can be dynamically changed using Asynchronous JavaScript and XML ("AJAX") calls. Many more elements are presented on the display of a modern web application than were presented in the past, and interaction between client and server is not always predictable. New AJAX frameworks, each having a different DOM and Javascript implementation and serving as a basis for web applications, are introduced on a regular basis. Thus, the changing web application development and execution environment makes recording and replaying scripts intended to automate operation of such applications increasingly difficult.

Traditionally, automating actions on application objects (e.g., user interface (UI) objects or widgets), such as in load testing, is based on classifying the target objects to types, or classes, possibly with single or multiple inheritance. Disclosed herein is a system and method for performing such automation, without classifying application objects to pre-defined class oriented types. Instead, role identification of application objects is implemented during execution of the application and user interaction with the objects.

In accordance with at least some embodiments, the logical "roles" of objects or object patterns (e.g., link, slider) are identified in the application with minimum prior knowledge of the specific application and/or its implementation. As used herein, a "role" refers to the behavior of an application object or object pattern (i.e., how a user interacts with an object and/or how an application responds to user interaction with an object), not just the appearance of the object or object pattern. The role identification technique described herein helps in making scripts more readable. Further, limitations resulting from having a small, predefined set of classes/types and applying one class/type to a given object or object pattern are avoided. In accordance with at least some embodiments, the same object or object pattern may be assigned more than one role (e.g., "link" and "image" roles, with no need for a pre-defined combination "image link"). Further, user actions are represented in a logical, user friendly way (e.g., a "slider move" instead of mouse movements with screen coordinates), as derived from the roles assigned to the acted on objects or/or object patterns.

In at least some embodiments, role standards (e.g., W3C's WAI ARIA) may be relied upon to implement object role identification techniques. Such role standards may provide a common terminology and parameterization that facilitates role assignments to objects and/or object patterns, but do not cover the actual operation of identifying application objects and assigning a role thereto while the application is in use. In at least some embodiments, roles can be assigned by observing the behavior of objects, and by querying WAI ARIA defined values, especially "role" values and "aria valuenow" values.

As an example of such observation/classification: if a dragged/dropped element moves only horizontally or only vertically (only one of its x/y coordinates changes), and a value of a nearby text field changes accordingly, then the object pattern that includes the moved element and the associated text field can be classified as a "slider." Further, a click on a grid with 7 columns that contains subsequent numbers from 1 to 31, that caused an input field to change to a valid date string can identify the grid as a "datepicker." Further, a repeating pattern of text lines can be identified as a "list." Further, a user click on an item in a "list," which results in the update of an input field can cause the list to be identified as a "listbox." Further, if a user action before clicking on an item includes typing into the changed input field and the previous value is contained within the new value, the "listbox" object can also receive the role "autocomplete." As mentioned previously, the same object or object pattern may have more than one role. Further, it should be noted that object roles may be assigned based on behavior (e.g., user actions and application response) and not just appearance. For example, the "slider" and "autocomplete" object roles described herein are assigned based on behavior.

The disclosed object role identification technique provides several benefits. For example, multiple roles may be assigned to objects or object patterns independently, so there is no need to predefine combinations of roles (e.g., an "image link"). Further, with a minimal set of recognized roles, an exponential set of objects and widgets types can be recognized and handled. Further, roles can be generically identified, assigned and used with minimum dependency on the specific implementation of an object or object pattern. Further, user actions may be expressed in a manner that is user-friendly, maintainable, intuitive, parameterizable, and verifiable. For example, a slider move can be expressed as setValue(userviewedvalue) instead of drag/drop to position pixel_count (which may be dependent on screen layout, and is subject to change between runs). Further, changes in an application object or object pattern (and its implementation) are possible without affecting the disclosed role identification technique. Further, the disclosed object role identification technique is efficient and enhances web automation scripting tools.

FIG. 1 shows a block diagram for a system 100 that performs role identification of application objects or object patterns while an application 110 is being executed. The system 100 comprises a client computer 102 with one or more processors 104 coupled to a system memory 106. Some embodiments of the client computer 102 also include a network adapter 126 and I/O devices 128 coupled to the processor 104. The client computer 102 is representative of a desktop computer, server computer, notebook computer, handheld computer, or smart phone, etc., in communication with a server computer 132 via a network 130.

The processor 104 is configured to execute instructions read from the system memory 106. The processor 104 may be, for example, be a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The system memory 106 corresponds to random access memory (RAM), which stores programs and/or data structures during runtime of the client computer 102. For example, during runtime of the client computer 102, the system memory 106 may store application 110, script 112, browser engine 108, and scripting application 114, which are loaded into the system memory 106 for execution by the processor 104.

The system 100 also may comprise a computer-readable storage medium 105, which corresponds to any combination of non-volatile memories such as semiconductor memory (e.g., flash memory), magnetic storage (e.g., a hard drive, tape drive, etc.), optical storage (e.g., compact disc or digital versatile disc), etc. The computer-readable storage medium 105 couples to I/O devices 128 in communication with the processor 104 for transferring data/code from the computer-readable storage medium 105 to the client computer 102. In some embodiments, the computer-readable storage medium 105 is locally coupled to I/O devices 128 that comprise one or more interfaces (e.g., drives, ports, etc.) to enable data to be transferred from the computer-readable storage medium 105 to the client computer 102. Alternatively, the computer-readable storage medium 105 is part of a remote system (e.g., a server) from which data/code may be downloaded to the client computer 102 via the I/O devices 128. In such case, the I/O devices 128 may comprise networking components (e.g., network adapter 126). Regardless of whether the computer-readable storage medium 105 is local or remote to the client computer 102, the code and/or data structures stored in the computer-readable storage medium 105 are loaded into system memory 106 for execution by the processor 104. For example, the scripting application 114 or other software/data structures in the system memory 106 of FIG. 1 may have been retrieved from computer-readable storage medium 105.

The I/O devices 128 also may comprise various devices employed by a user to interact with the processor 104 based on programming executed thereby. Exemplary I/O devices 128 include video display devices, such as liquid crystal, cathode ray, plasma, organic light emitting diode, vacuum fluorescent, electroluminescent, electronic paper or other appropriate display panels for providing information to the user. Such devices may be coupled to the processor 104 via a graphics adapter. Keyboards, touchscreens, and pointing devices (e.g., a mouse, trackball, light pen, etc.) are examples of devices includable in the I/O devices 128 for providing user input to the processor 104 and may be coupled to the processor by various wired or wireless communications subsystems, such as Universal Serial Bus (USB) or Bluetooth interfaces.

A network adapter 126 may couple to the processor 104 to allow the processor 104 to communicate with a server computer 132 via the network 130. For example, the network adapter 126 may enable the client computer 102 to acquire content 134 (e.g., web pages, applications, images, audio, etc.) from the server computer 132. The network adapter 126 may allow connection to a wired or wireless network, for example, in accordance communication protocols such as IEEE 802.11, IEEE 802.3, Ethernet, cellular protocols, etc. The network 130 may comprise any available computer networking arrangement such as a local area network ("LAN"), a wide area network ("WAN"), a metropolitan area network ("MAN"), the internet, etc. Further, the network 130 may comprise any of a variety of networking technologies, for example, wired, wireless, or optical techniques may be employed. Accordingly, the server computer 132 is not restricted to any particular location or proximity to the client computer 102.

Referring again to the system memory 106, various data and program modules stored therein for execution will now be described. The application 110 may be, for example a web page, web application, or other application to be automated. The application 110 may comprise a portion of the content 134 provided by the server computer 132. In some embodiments, the application 110 represents a portion of an application retrieved from the server computer 132 wherein different portions of the application 110 are executed by the processor 104 and a different processor (not shown) of the server computer 132. The application 110 may include executable programming and various user interface (UI) objects (e.g., links, buttons, widgets, etc). In accordance with at least some embodiments, the application 110 is hosted by a browser engine 108 executed by the processor 104.

The scripting application 114, when executed by the processor 104, monitors user generated events and/or other events affecting the application 110. The scripting application 114 analyzes the detected events and effects on the application 110 ensuing from the detected events, and records various results of the analyses as steps in one or more scripts 112. The scripts 112 may additionally or alternatively represented previously prepared scripts that are made available to the scripting application 114. In some embodiments, the scripts 112 include a set of dynamic shared object containers, the data structures of which can be configured to form a DOM-like document.

As shown, the scripting application 114 comprises a UI object identifier 116, an object role assigner 118 and automated functions 124. When executed, the UI object role identifier 116 identifies UI objects and/or object patterns in the browser hosted application 110. For each UI object and/or object pattern identified, the object role assigner 118 assigns at least one of a plurality of roles 120. The roles 120 may be predetermined and, in some embodiments, may be based on UI object role standards such as W3C's WAI ARIA. In at least some embodiments, assigned roles may be used with the script 112 (e.g., to determine which events to record or to replay). The decision to record particular user actions on UI objects and/or UI object patterns may be based on previous user input and/or ongoing user input regarding roles. For example, UI object roles and/or UI object pattern roles may be displayed to a user of the scripting application 114. In response to user input, particular UI object roles and/or particular UI object pattern roles are selected for use with script recording and/or replay operations. Further, the assigned roles may be used with various automated functions 124 of the scripting application 114 including, but not limited to, functional testing, load testing, application integration, macro development, and data scraping. In some embodiments, such automated functions 124 are configured to operate in conjunction with browser hosted application 110.

To summarize, while the browser engine 108 hosts an application having user interface (UI) objects (e.g., application 110), execution of the scripting application 114 causes the processor 104 to selectively record user actions on the UI objects based on identification of at least one role for each UI object. The scripting application 114 also may cause the processor 104 to assign multiple roles to a single UI object and/or a single UI object pattern. The scripting application 114 also may cause the processor 104 to selectively record user actions corresponding to UI object patterns within the browser hosted application based on identification of at least one role for each UI object pattern. In at least some embodiments, the roles are assigned to UI objects and/or UI object patterns by accessing a database of predetermined UI object roles and UI object pattern roles. The assigned roles may be used to perform various automated functions 124 of the scripting application 114. For example, roles for identified UI objects and/or UI object patterns may be displayed to a user of the scripting application 114. Subsequently, an automated function such as recording user actions related to displayed UI object roles and/or UI object pattern roles is performed in response to user input. Other automated functions of the scripting application 114 that may perform operations based on assigned roles include replaying recorded user actions, functional testing, load testing, application integration, macro development, and data scraping.

In at least some embodiments, the scripting application 114 is stored by a computer-readable storage medium (e.g., the computer-readable storage medium 105) for later access and execution by a processor (e.g., processor 104). Although not required, the computer-readable storage medium may be distributed as a portable memory (e.g., an optical disk or flash memory). Alternatively, the scripting application 114 is downloaded from a server for storage in a computer-readable medium of the computer system that executes the scripting application 114 as described herein. When executed, the disclosed scripting application causes a processor to perform the scripting application operations described herein. Such scripting application operations include, identifying user interface (UI) objects (or UI object patterns) of a browser hosted application, assigning roles to the identified UI objects (or UI object patterns), and selectively recording user actions on the UI objects based on the assigned roles. Further, the scripting application operations may include selectively assigning multiple roles to a single UI object or a single UI object pattern. Further, the scripting application operations may include accessing a set of predetermined UI object roles (or predetermined UI object pattern roles) and selectively assigning at least one predetermined UI object role (or predetermined object pattern role) to each UI object identified within the browser hosted application. Further, the scripting application operation may include displaying UI object roles and recording user actions related to the displayed UI object roles in response to user input. Further, other automated functions may be performed in response to user input regarding the assigned UI object roles or the assigned UI object pattern roles.

Figure 2:
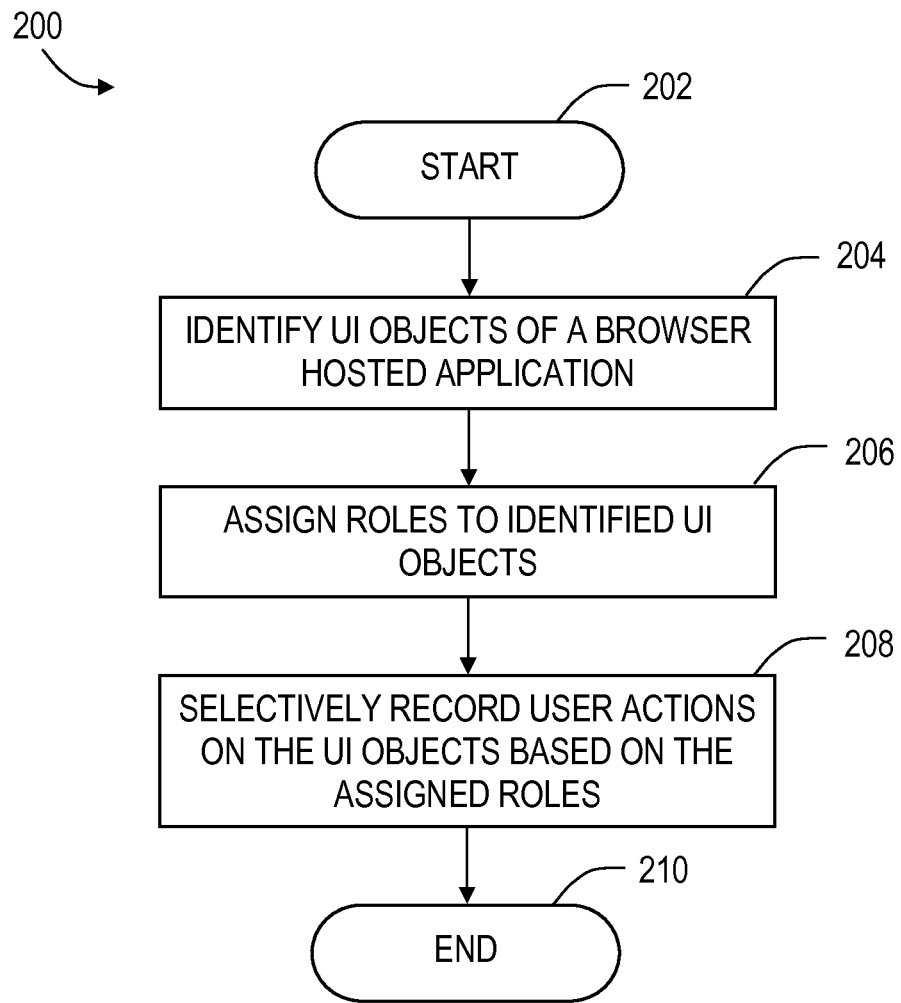
FIG. 2 shows a method for a scripting application in accordance with an embodiment of the disclosure.

FIG. 2 shows a method 200 for a scripting application in accordance with an embodiment of the disclosure. Though depicted sequentially as a matter of convenience, at least some of the actions shown can be performed in a different order and/or performed in parallel. Additionally, some embodiments may perform only some of the actions shown. In some embodiments, the operations of FIG. 2, as well as other operations described herein, can be implemented as instructions stored in a computer-readable storage medium (e.g., computer-readable storage medium 105) and executed by a processor (e.g., processor 104).

The method 200 starts at block 202 and continues to block 204 where UI objects of a browser hosted application are identified. At block 206, roles are assigned to the identified UI objects. For example, the roles may be assigned by accessing a database of predetermined UI object roles. In at least some embodiments, multiple roles are assigned to a single UI object. Further, at block 208, user actions are selectively recorded based on the assigned roles and the method ends at block 210. In some embodiments, user actions such as those recorded at block 208 may cause new roles to be assigned to the original object or related objects. In other words, assuming the method 200 is executed multiple times (or at least block 206 is executed multiple times), ongoing user actions will affect the roles assigned to objects at block 206.

The method 200 may additionally or alternatively identify UI object patterns in the browser hosted application and selectively assign multiple roles to a single UI object pattern. Further, the method 200 may additionally display assigned UI object roles and/or UI object pattern roles for selection by a user of the scripting application. The selected UI object roles and/or UI object pattern roles are used for automated functions such as recording user actions on UI object for a script, replaying recorded user actions, functional testing, load testing, application integration, macro development and/or data scraping.

The above discussion is meant to be illustrative of the principles and various embodiments of the present invention. Numerous variations and modifications will become apparent to those skilled in the art once the above disclosure is fully appreciated. For example, while script recording and automation of an application have been generally described by reference to a web application, those skilled in the art will understand that embodiments are applicable to a variety of different applications. It is intended that the following claims be interpreted to embrace all such variations and modifications.

What is claimed is:

1. A method for a scripting application, comprising:
identifying, by a processor, user interface (UI) objects of a browser hosted application;
assigning, by the processor, roles to the identified UI objects;
identifying UI object patterns in the browser hosted application;
assigning roles to the identified UI object patterns;
selectively assigning multiple roles to a single UI object pattern;
selectively recording, by the processor, in a script file user actions on the UI objects based on the assigned roles; and
performing, by the processor replay operations based on the user actions selectively recorded in the script file.

2. The method of claim 1 wherein further comprising performing, by the processor, an additional operation, the additional operation selected from a list containing functional testing, load testing, application integration, macro development and data scraping.

3. The method of claim 1 wherein assigning roles to the identified UI objects comprises accessing a database of predetermined UI object roles.

4. The method of claim 1 further comprising displaying the identified UI object roles and recording user actions related to the displayed UI object roles in response to user input.

5. The method of claim 1, wherein identifying the UI objects and assigning roles to the identified UI objects is performed during execution of the browser hosted application.

6. A computer system, comprising:
a processor; and
a computer-readable storage medium coupled to the processor and storing a scripting application,
wherein the scripting application, when executed, is configured to:
identify user interface (UI) objects of a browser hosted application;
assign roles to the identified UI objects;
identify UI object patterns in the browser hosted application;
assign roles to the identified UI object patterns;
selectively assign multiple roles to a single UI object pattern;
selectively record in a script file user actions on the UI objects based on the assigned roles; and
perform replay operations based on the user actions.

7. The computer system of claim 6 wherein the scripting application, when executed, is configured to perform an additional operation, which is selected from a list containing functional testing, load testing, application integration, macro development and data scraping.

8. The computer system of claim 6 wherein the scripting application, when executed, is configured to selectively record user actions corresponding to UI object patterns within the browser hosted application based on identification of at least one role for each UI object pattern.

9. The computer system of claim 6 wherein the scripting application, when executed, is configured to assign roles to UI objects and UI object patterns by accessing a database of predetermined UI object roles and UI object pattern roles.

10. The computer system of claim 6 further comprising a display coupled to the processor,
wherein the scripting application, when executed, is configured to display identified UI object roles and UI object pattern roles on the display and to record user actions related to the displayed UI object roles and displayed UI object pattern roles in response to user input.

11. The computer system of claim 6 wherein the scripting application, when executed, is configured to perform an automated function using roles assigned to UI objects and UI object patterns of the browser hosted application.

12. The computer system of claim 6, wherein the scripting application, when executed, is to cause the processor to identify the UI objects and assign the roles to the UI objects during execution of the browser hosted application.

13. A non-transitory computer-readable medium storing scripting application code that, when executed, causes a processor to:
identify user interface (UI) objects of a browser hosted application;
assign roles to the identified UI objects;
identify UI object patterns in the browser hosted application and to assign roles to identified UI object patterns;
selectively assign multiple roles to a single UI object pattern;
selectively record in a script file user actions on the UI objects based on the assigned roles; and
perform replay operations based on the user actions recorded in the script file.

14. The non-transitory computer-readable medium of claim 13 wherein execution of the scripting application code further causes the processor to perform an additional operation selected from a list containing functional testing, load testing, application integration, macro development and data scraping.

15. The non-transitory computer-readable medium of claim 13 wherein execution of the scripting application code further causes the processor to access a set of predetermined UI object roles and to selectively assign at least one predetermined UI object role to each UI object identified within the browser hosted application.

16. The non-transitory computer-readable medium of claim 13 wherein execution of the scripting application code further causes the processor to access a set of predetermined UI object pattern roles and to selectively assign at least one role to each UI object pattern identified within the browser hosted application.

17. The non-transitory computer-readable medium of claim 13 wherein execution of the scripting application code further causes the processor to display identified UI object roles and to record user actions related to the displayed UI object roles in response to user input.

18. The non-transitory computer-readable medium of claim 13 wherein execution of the scripting application code further causes the processor to perform an automated function using roles assigned to UI objects and UI object patterns of the browser hosted application.

19. The non-transitory computer-readable medium of claim 13 wherein execution of the scripting application code further causes the processor to identify the UI objects and assign roles to the UI objects during execution of the browser hosted application.

20. The non-transitory computer-readable medium of claim 13 wherein execution of the scripting application code further causes the processor to:
detect events affecting execution of the browser hosted application;
observe behavior of the identified UI objects resulting from the detected events; and
assign the roles to the UI objects based on the detected events and the observed behavior.

* * * * *

UNITED STATES PATENT AND TRADEMARK OFFICE
CERTIFICATE OF CORRECTION

| | | |
|---|---|---|
| PATENT NO. | : 9,053,241 B2 | Page 1 of 1 |
| APPLICATION NO. | : 12/814345 | |
| DATED | : June 9, 2015 | |
| INVENTOR(S) | : Dror Schwartz et al. | |

It is certified that error appears in the above-identified patent and that said Letters Patent is hereby corrected as shown below:

IN THE CLAIMS

In column 7, line 14, in Claim 1, delete "processor" and insert -- processor, --, therefor.

Signed and Sealed this
First Day of March, 2016

Michelle K. Lee
*Director of the United States Patent and Trademark Office*